(12) United States Patent
Debates et al.

(10) Patent No.: US 9,749,954 B2
(45) Date of Patent: Aug. 29, 2017

(54) RFID CONTEXTUAL LOCATION DETERMINATION AND SENSING

(71) Applicant: Motorola Mobility LLC, Chicago, IL (US)

(72) Inventors: Scott Debates, Crystal Lake, IL (US); Douglas A Lautner, Round Lake, IL (US)

(73) Assignee: Motorola Mobility LLC, Chicago, IL (US)

( * ) Notice: Subject to any disclaimer, the term of this patent is extended or adjusted under 35 U.S.C. 154(b) by 92 days.

(21) Appl. No.: 14/843,224

(22) Filed: Sep. 2, 2015

(65) Prior Publication Data

US 2017/0064627 A1 Mar. 2, 2017

(51) Int. Cl.
*H04B 7/00* (2006.01)
*H04W 52/02* (2009.01)
*H04W 4/00* (2009.01)
*H04W 12/06* (2009.01)
*H04W 84/12* (2009.01)

(52) U.S. Cl.
CPC ....... *H04W 52/0225* (2013.01); *H04W 4/008* (2013.01); *H04W 12/06* (2013.01); *H04W 84/12* (2013.01)

(58) Field of Classification Search
CPC ......... H04W 52/0225; H04W 52/0235; H04W 52/0245; H04W 52/0254; H04W 52/0274
USPC ............... 270/310, 328, 239, 349, 431, 437; 370/310, 328, 239, 349, 431, 437
See application file for complete search history.

(56) References Cited

U.S. PATENT DOCUMENTS

| | | | | |
|---|---|---|---|---|
| 8,180,291 | B2 * | 5/2012 | Burr | H04W 52/0225 455/343.2 |
| 8,989,767 | B2 * | 3/2015 | Walker | H04L 63/0853 455/404.2 |
| 9,087,246 | B1 * | 7/2015 | Chin | G06K 7/10297 |
| 9,363,635 | B2 * | 6/2016 | Finlow-Bates | H04W 4/021 |
| 9,509,676 | B1 * | 11/2016 | Johnson | H04L 63/08 |
| 2007/0298726 | A1 * | 12/2007 | Fuqua | H04B 1/48 455/73 |

* cited by examiner

Primary Examiner — Dmitry H Levitan

(57) ABSTRACT

In embodiments of RFID-based activation for wireless network communication, a mobile device includes a RFID reader to interrogate and communicate with a RFID tag to retrieve information associated with a wireless network. An activation module is implemented to receive a notification from the RFID reader that the wireless network is available based on communication with the RFID tag, which can also include receiving authentication credentials associated with the wireless network. The activation module can then activate a wireless transceiver of the mobile device and connect to the wireless network using the received authentication credentials.

20 Claims, 7 Drawing Sheets

RFID CONTEXTUAL LOCATION DETERMINATION AND SENSING

BACKGROUND

Portable devices, such as mobile phones, tablet devices, digital cameras, media playback, and other types of computing and electronic devices can typically run low on battery power, particularly when a device is utilized extensively between battery charges and device features unnecessarily drain battery power. For example, many of the portable devices include multiple radio transceivers to communicate wirelessly with other electronic and computing devices using well-known communication protocols. Typically, a Wi-Fi transceiver is included in a mobile device to allow the mobile device to connect to a wireless network via a Wi-Fi access point. However, many of the radio transceivers included in a portable device unnecessarily drain the battery power. For example, a Wi-Fi transceiver that is not connected to a wireless network consumes more battery power, such as when seeking available network connections, than when the Wi-Fi transceiver is connected to a wireless network.

BRIEF DESCRIPTION OF THE DRAWINGS

Embodiments of RFID contextual location determination and sensing for wireless communication are described with reference to the following Figures. The same numbers may be used throughout to reference like features and components that are shown in the Figures.

DETAILED DESCRIPTION

Figure 1:
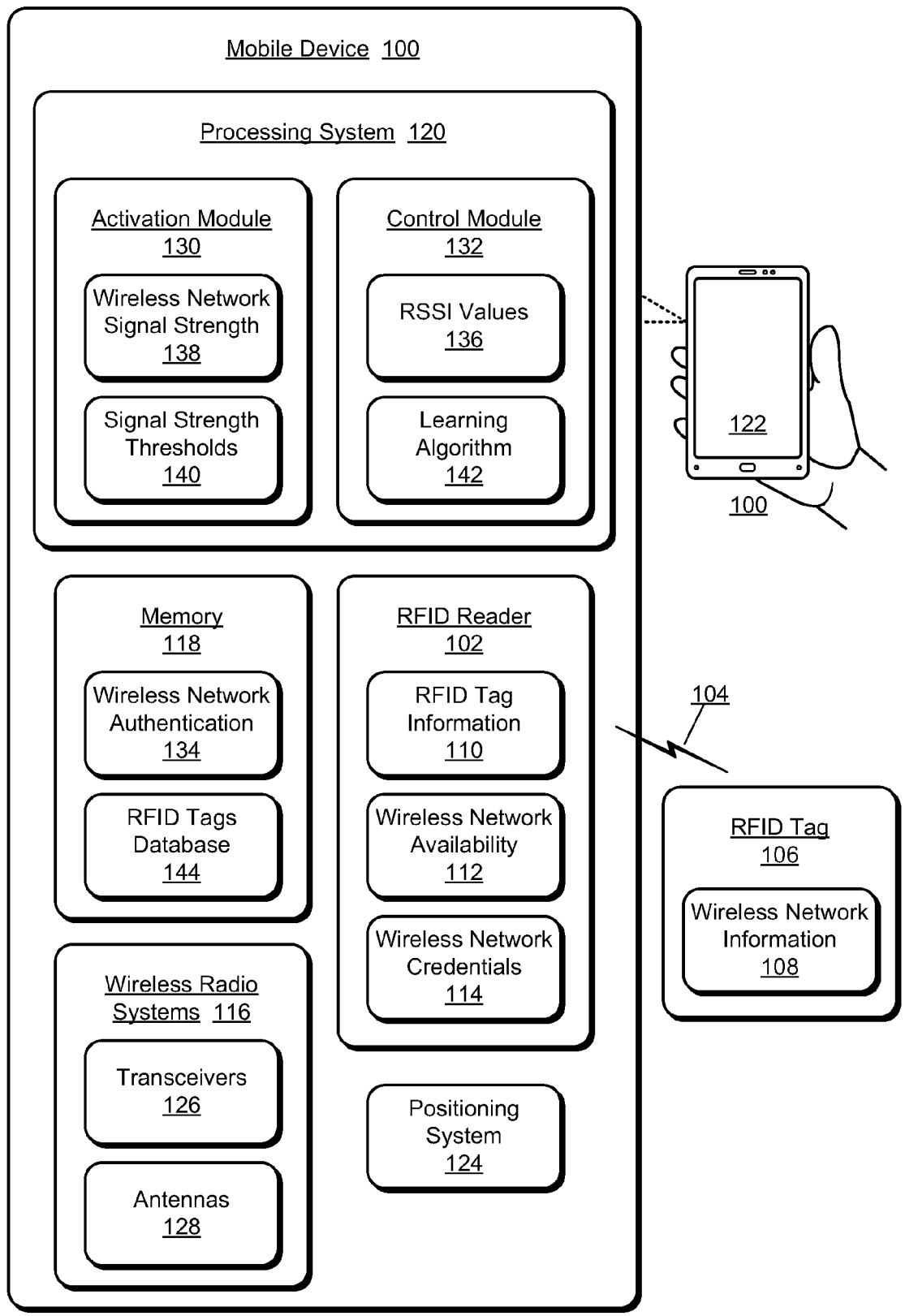
FIG. 1 illustrates an example mobile device in which embodiments of RFID contextual location determination and sensing can be implemented.

Embodiments of RFID contextual location determination and sensing for wireless communication are described, such as for any type of mobile device that may be implemented with a RFID reader system and one or more wireless radio systems transceivers, such as a Wi-Fi transceiver for wireless communication via a wireless network. Typically, a Wi-Fi transceiver in a mobile device is connected to a wireless network, such as when a user of the device is at home or at work, and Wi-Fi transceiver connects the mobile device to the home or work wireless network. However the Wi-Fi transceiver (and/or other wireless system transceivers) can unnecessarily drain the battery power of the mobile device if the Wi-Fi transceiver is not connected to the wireless network or an antenna power of the Wi-Fi transceiver is not optimized based on the wireless network signal strength.

In aspects of RFID-based activation for wireless network communication, a mobile device is implemented to communicate with an RFID tag and activate or deactivate transceivers in the mobile device to conserve or efficiently utilize battery power of the device. For example, a RFID tag may be placed near an entryway or doorway of a residence or building, and as a user of a mobile device enters the residence or building with the device passing near the RFID tag, the mobile device communicates with the RFID tag. In response to communicating with the RFID tag, a Wi-Fi transceiver in the mobile device can then be activated, turned on, or enabled. Additionally, in response to communicating with the RFID tag as the user exits the residence or building, the Wi-Fi transceiver can then be deactivated.

In implementations, a mobile device can implement an activation module that activates the Wi-Fi transceiver and connects to a wireless network based on the communication with the RFID tag. Additionally, the activation module can deactivate the Wi-Fi transceiver based on the communication with the RFID and the previously connected wireless network is no longer available. Accordingly, utilizing the RFID tag for activating or deactivating the Wi-Fi transceiver allows the activation module to manage power consumption of the Wi-Fi transceiver, and battery power of the mobile device is conserved by utilizing the Wi-Fi transceiver based on communication with the RFID tag.

In aspects of RFID-based location determination for antenna power adjustment, a mobile device is implemented to scan for RFID tags within range and adjust antenna power of a Wi-Fi transceiver (and/or other wireless system transceivers) based on the signal strength of a wireless network and the location of the mobile device in relation to the distance away from an access point. For example, the mobile device may be located in an office that has a Wi-Fi access point, and the office contains a desk with an RFID tag. When the mobile device communicates with the RFID tag on the desk in the office, the antenna power of the Wi-Fi transceiver in the mobile device can be decreased without negatively impacting the data throughput of the Wi-Fi connection due to the close proximity of the mobile device to the Wi-Fi access point.

In implementations, a mobile device includes a Wi-Fi transceiver and a RFID reader that communicates with an RFID tag. The mobile device can implement a control module that includes a learning algorithm, which contextually learns about rooms within a residence or building based on the communication with RFID tags in the residence or building. The learning algorithm can store and maintain RFID tag information in a database, as well as information regarding the rooms within the residence or building, wireless networks, and associated signal strengths of the wireless networks. Based on the information in the database and the current location (determined room) of the mobile device within the residence or building, the learning algorithm can invoke the control module to adjust the antenna power of the Wi-Fi transceiver. Accordingly, utilizing the control module allows for optimization of antenna power based on the current location of the mobile device within a residence or building, and battery power of the mobile device is efficiently utilized by the Wi-Fi transceiver based on the learning algorithm.

While features and concepts of RFID contextual location determination and sensing can be implemented in any number of different devices, systems, environments, and/or configurations, embodiments of RFID contextual location determination and sensing are described in the context of the following example devices, systems, and methods.

FIG. 1 illustrates an example mobile device 100 in which embodiments of RFID contextual location determination and sensing for wireless network communication can be implemented. The example mobile device 100 may be any type of mobile phone, tablet device, media playback, computing, communication, gaming, entertainment, digital camera, or other type of computing and electronic device that is typically battery powered. In this example, the mobile device 100 implements components and features of a RFID reader 102 (also referred to as a RFID interrogator) that is implemented for two-way wireless communication 104 with radio-frequency identification (RFID) tags, such as RFID tag 106 that is activated in the presence of the RFID reader 102 when interrogated for sensor data. Generally, the RFID tags are small electronic tags or labels that can be programmed with identifying data or other information. The RFID reader 102 can transmit an interrogation signal as a broadcast message requesting RFID tags that are in range to return the identifying data or information that the RFID tags have stored. The RFID tags can then wirelessly communicate the data information to the RFID reader via a radio frequency (RF) communication channel.

In implementations, an RFID tag (e.g., RFID tag 106) can include an ASIC/CPU module, as well as a transmitter and a receiver (or may be implemented as a transceiver) for two-way communication with the RFID reader 102. In response to receipt of an interrogation signal, the ASIC/CPU module of the RFID tag formulates a response that may include data from the RFID tag, and the response is wirelessly transmitted to the mobile device 100. The response signals from a RFID tag can be communicated using low frequency (LF), high frequency (HF), or ultra-high frequency (UHF) radio waves. The RFID tag data can be stored in non-volatile memory, and the ASIC/CPU module can be implemented as fixed or programmable logic for processing the RFID tag data, as well as modulating and demodulating the RF signals. The RFID reader 102 of the mobile device 100 receives the response signals from the RFID tag, and the response signals can include the data from the RFID tag. The response signal and data received by the RFID reader 102 can include information that an RFID tag is storing, has obtained, is producing, and so forth. Further, the response signal and data received from an RFID tag can include identification information, such as a code or an alphanumeric value, a parameter derived from a sensor including a sensor value, a parameter value, a descriptive indication, or some combination thereof.

As described herein, the RFID reader 102 can interrogate one or more RFID tags, represented by the RFID tag 106, which effectively requests the RFID tags to provide data or information wirelessly. In this example, the RFID tag 106 maintains wireless network information 108, which is communicated to the RFID reader 102 as RFID tag information 110, wireless network availability 112, and wireless network credentials 114.

The RFID tag information 110 includes information that describes and/or is associated with the RFID tag 106, an object associated with the RFID tag, a physical location of the RFID tag 106, and so forth. The wireless network availability 112 is information that includes an indication a wireless network is available based on the information read from the RFID tag. The wireless network credentials 114 can optionally be read from the RFID tag 106 and can be utilized by one or more wireless radio systems 116 of the mobile device 100 to connect to a wireless network. Although shown as information associated with the RFID reader 102 in this example, the RFID tag information 110, the wireless network availability 112, and the wireless network credentials 114 may be maintained by other components in the mobile device 100 separate from the RFID reader 102, such as with device memory 118 of the mobile device.

The mobile device 100 can be implemented with various components, such as a processing system 120 (e.g., one or more processors), the memory 118, an integrated display device 122, and any number and combination of various components as further described with reference to the example device shown in FIG. 7. For example, the mobile device includes a positioning system 124 that is utilized to capture the geographical location of the mobile device 100, such as with a Global Positioning System (GPS) transceiver or another geo-location device. Although not shown, the mobile device 100 can also include a power source, such as a battery, to power the various device components. Further, the mobile device 100 can include the different wireless radio systems 116, such as for Wi-Fi, Bluetooth™, Mobile Broadband, LTE, Near Field Communication (NFC), or any other wireless communication system or format, configured for communication via respective wireless networks. Generally, the mobile device 100 implements the wireless radio systems 116 that each includes a transceiver 126 and an antenna 128 for wireless communication with other devices, networks, and services.

In this example, the mobile device 100 includes an activation module 130 and/or a control module 132 to implement embodiments of RFID contextual location determination and sensing for wireless network communication, as described herein. The activation module 130 and the control module 132 can each be implemented as a software application or module, such as computer-executable software instructions that are executable with a processor (e.g., with the processing system 120) to implement embodiments described herein. The activation module 130 and the control module 132 can be stored on computer-readable storage memory (e.g., the device memory 118), such as any suitable memory device or electronic data storage implemented in the mobile device. Although shown as separate software applications or modules, the activation module 130 and the control module 132 may be integrated as a module or component in the mobile device 100 to implement the embodiments described herein.

In embodiments of RFID-based activation for wireless network communication, the RFID reader 102 can interrogate and communicate with RFID tags, such as the RFID tag 106. The activation module 130 is implemented to receive a notification from the RFID reader 102 that one or more wireless networks are available based on communication with at least one of the RFID tags. Further, the activation module 130 can receive the wireless network credentials 114, such as authentication information that allows a wireless radio system 116 of the mobile device 100 to connect to one of the wireless networks based on a type of read of the RFID tag 106 performed by RFID reader 102. The activation module 130 can then activate the transceiver 126 of the wireless radio system 116 for communication via the wireless network that is determined available based on communication with the RFID tag 106.

In implementations, the RFID reader 102 can transmit an authentication key, such as from information for wireless network authentication 134, to the RFID tag 106 and receive the wireless network credentials 114 from the RFID tag, such as for a secure read of the RFID tag. The activation module 130 can then initiate the connection of the transceiver 126 to the wireless network (e.g., a secure network) using the received wireless network credentials 114. Alternatively, the RFID reader 102 can interrogate the RFID tag 106, receive the authentication information (e.g., the wireless network information 108) that allows the mobile device 100 to connect to a guest network, and the activation module 130 activates the transceiver 126 of the respective wireless radio system to connect to the guest network utilizing the received information. The activation module 130 is also implemented to deactivate the transceiver 126 that is connected to a wireless network based on a determination that the wireless network is no longer available. The control module 132 is implemented to compute received signal strength indicator (RSSI) values 136 for the wireless networks, and the activation module 130 maintains corresponding wireless network signal strengths of the wireless networks, as well as signal strength thresholds 140 of the wireless networks.

In embodiments of RFID-based location determination for antenna power adjustment, the RFID reader 102 can interrogate and communicate with RFID tags, such as the RFID tag 106. The control module 132 is implemented to determine a current location of the mobile device 100 based on physical locations associated with each of the respective RFID tags. The control module 132 can then adjust the power of an antenna 128 of the transceivers 126 based on the current location of the mobile device, where the antenna power is adjusted for a signal strength 138 of a wireless signal of a wireless network.

In this example, the control module 132 includes a learning algorithm 142 that is implemented to maintain (e.g., generate and update) a RFID tags database 144 (stored in device memory 118) that correlates identifiers of the RFID tags 106 and the wireless signal of the wireless network with respective physical locations of the RFID tags. Each of the RFID tags may also be associated with an object at a respective physical location of a RFID tag. The learning algorithm 142 can then reference the identifiers of the RFID tags 106 in the database 144 and determine the current location of the mobile device. The control module 132 can initiate adjusting the antenna power of an antenna 128 of one of the transceivers 126 such that the antenna power is adjusted for a signal strength of a wireless network based on the current location of mobile device 100. In implementations, the RFID tags database 144 can also include information about one or more rooms within a residence, building, or general area, and the signal strength of the wireless signal corresponding to each of the rooms in residence or building.

In implementations, the learning algorithm 142 of the control module 132 is implemented to compare a threshold count to a number of times that each of the RFID tags 106 has been identified, and adjust the rate at which the RFID tags are identified. Additionally, the control module 132 can initiate adjusting the antenna power of an antenna 128 of a transceiver 126 by comparing the signal strength of the wireless signal to a first threshold and a second threshold (e.g., signal strength thresholds 140) for the signal strength 138, where the first threshold indicates that the signal strength is high and the second threshold indicates that the signal strength is low. The control module 132 can then decrease the antenna power of the transceiver 126 if the signal strength meets or exceeds the first threshold, or increase the antenna power of the transceiver 126 if the signal strength does not at least meet the second threshold.

Figure 2:
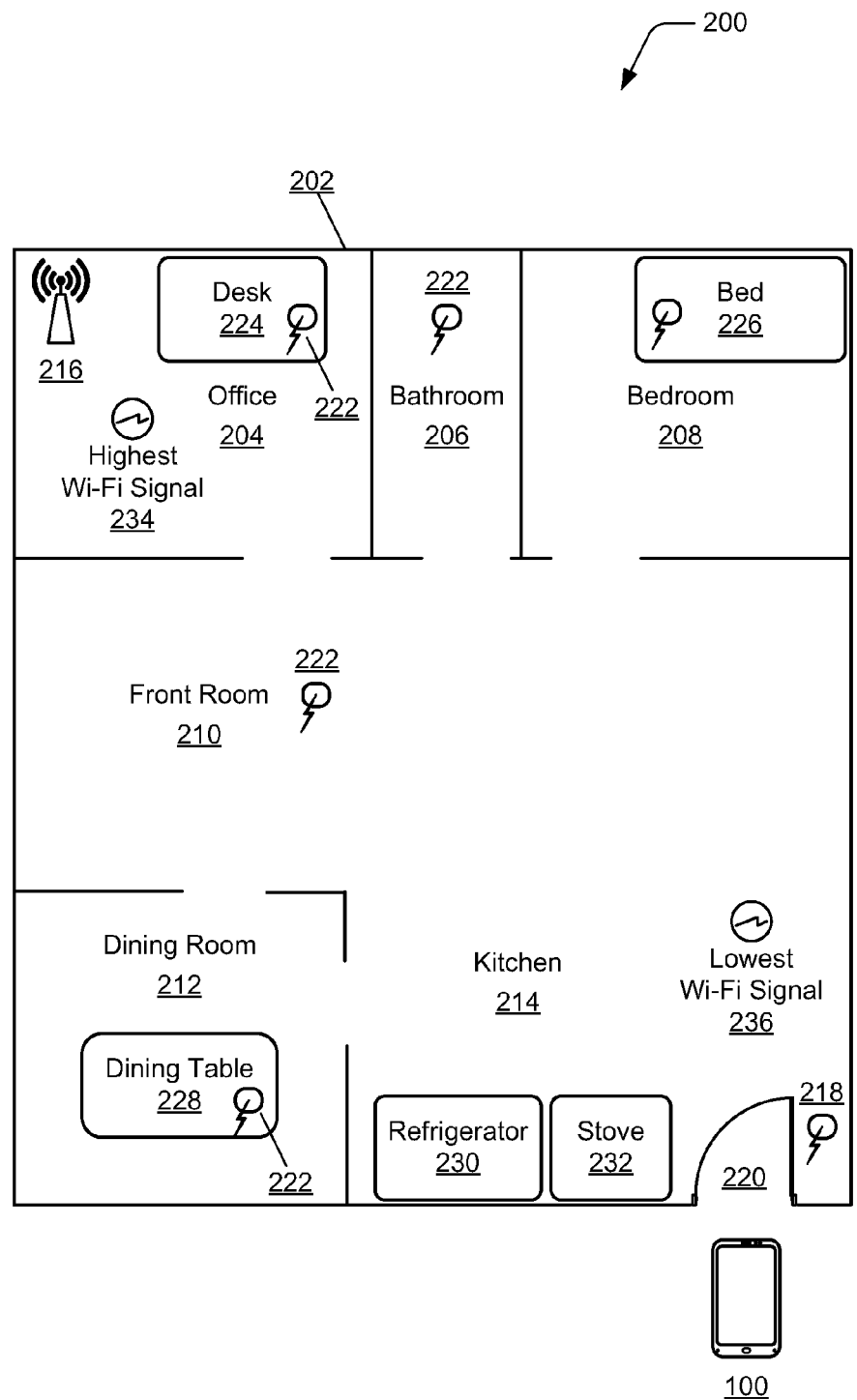
FIG. 2 illustrates examples of RFID contextual location determination and sensing in accordance with one or more embodiments.

FIG. 2 illustrates an example 200 of RFID contextual location determination and sensing for wireless network communication, as described herein. A building, space, general area, or residence 202 includes various areas that include an office 204, a bathroom 206, a bedroom 208, a front room 210, a dining room 212, and a kitchen 214. The residence 202 also contains an access point 216 of a wireless network (e.g., a Wi-Fi network) that is located in the office 204 to broadcast a Wi-Fi signal throughout the residence.

In this example, a RFID tag 218 is located in a doorway 220 of the residence 202, and the RFID tag 218 can respond to an interrogation by the RFID reader 102 of the mobile device 100. Additionally, the RFID tag 218 can respond with the specific information based on the type of read or interrogation performed by the RFID reader 102. In implementations, the RFID tag 218 is a passive device which has a communication range up to approximately two meters. Alternatively, the RFID tag 218 is an active device which contains an internal power source, such as a battery, to power the RFID tag to allow for a communication range greater than three meters.

The various areas in the residence 202 can each have an associated RFID tag 222, and each of the RFID tags 222 may also be associated with an object at a respective physical location of a RFID tag. For example, the office 204 includes desk 224 which has a RFID tag 222 for the office area, and the bathroom area and the front room area has a RFID tag 222. Each object within residence 202 can also contain one or more RFID tags 222, such as a bed 226 in the bedroom area, a dining table 228 in the dining room area, and a refrigerator 230 and stove 232 in the kitchen area. Each of the RFID tags can respond with specific information to an interrogation by the RFID reader 102 of the mobile device 100, where the information is associated with the RFID tag, the object associated with the RFID tag, wireless network information, and/or wireless network credentials to connect to a particular wireless network (e.g., of the access point 216).

When the mobile device 100 is near the access point 216, a highest Wi-Fi signal 234 has a strength that is detected and determined by the mobile 100 due to the close proximity to the access point in the office area. As the mobile device 100 learns the location proximate the office area when detecting and communicating with the RFID tag 222 located at the desk 224, the Wi-Fi antenna power can be decreased so that the mobile device conserves battery power, yet maintains a strong wireless signal. When the mobile device 100 is further away, a lowest Wi-Fi signal strength 236 is detected and determined by the mobile device 100 due to the distance between the access point 216 and the mobile device 100. As the mobile device 100 learns the location proximate the kitchen area when detecting and communicating with the RFID tags 222 located at the refrigerator 230 and the stove 232, the Wi-Fi antenna power can be increased so that the signal maintains the best possible coverage.

Example methods 300, 400, 500, and 600 are described with reference to respective FIGS. 3-6 in accordance with implementations of RFID contextual location determination and sensing for wireless network communication. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
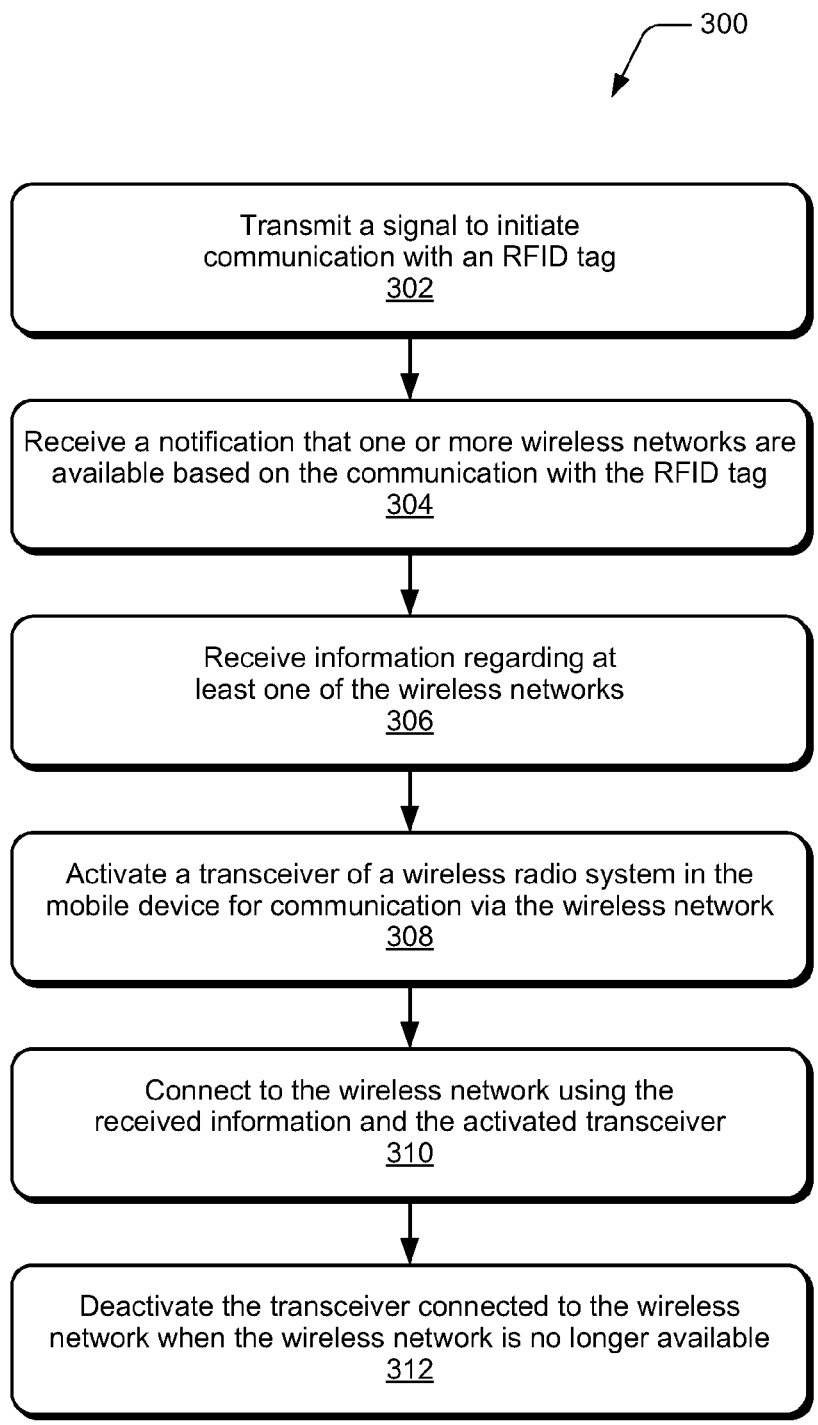
FIGS. 3 and 4 illustrate example methods of RFID-based activation for wireless network communication in accordance with one or more embodiments.

FIG. 3 illustrates example method(s) 300 of RFID-based location and activation for wireless network communication. The order in which the method is described is not intended to be construed as a limitation, and any number or combination of the described method operations can be performed in any order to perform a method, or an alternate method.

At 302, a signal is transmitted to initiate communication with an RFID tag. For example, the RFID reader 102 of the mobile device 100 transmits a signal to the RFID tag 106 to interrogate and perform a read of the RFID tag, such as when a user carries the mobile device 100 into the residence 202 through the doorway 220. As the mobile device 100 passes near the RFID tag 218, the RFID reader 102 of the mobile device 100 transmits a signal 104 that is received by the RFID tag.

At 304, a notification is received that one or more wireless networks are available based on the communication with the RFID tag. For example, the RFID reader 102 of the mobile device 100 receives a notification from the RFID tag 106 that one or more wireless networks are available, such as the wireless network availability 112 received as part of the wireless network information 108 that is maintained by the RFID tag 106.

At 306, information is received regarding at least one of the wireless networks. For example, the RFID reader 102 of the mobile device 100 receives additional information regarding one of the wireless networks, such as the wireless network credentials 114 and/or other information regarding how to connect to a wireless network. The received information can be an authentication key that allows the mobile device 100 to initiate a connection to a specific wireless network using a Wi-Fi transceiver 126 of a wireless radio system 116 in the mobile device.

At 308, a transceiver of a wireless radio system is activated in the mobile device for communication via the wireless network. For example, the activation module 130 that is implemented in the mobile device 100 activates one or more of the transceivers 126 responsive to receiving the information regarding the wireless networks.

At 310, the wireless network is connected to using the received information and the activated transceiver. For example, the activation module 130 that is implemented in the mobile device 100 connects the one or more transceivers 126 to the respective wireless networks that are available using the received information and the activated transceiver. In an implementation, the activation module 130 can utilize a Wi-Fi transceiver 126 to connect the wireless network without scanning for other wireless networks that may be available, thus conserving device battery power. Alternatively, the activation module 130 can utilize the Wi-Fi transceiver 126 to scan for other available wireless networks before connecting.

At 312, the transceiver that is connected to the wireless network is deactivated when the wireless network is no longer available. For example, the activation module 130 that is implemented in the mobile device 100 deactivates a transceiver that is connected to a wireless network when the wireless network is no longer available, such as when a user leaves the residence 202 with mobile device 100 and the wireless network that the Wi-Fi transceiver 126 was connected to is no longer within communication range. The activation module 130 can also be implemented to deactivate a transceiver 126 after a specified amount of time has elapsed and/or when the wireless network is no longer available.

Figure 4:
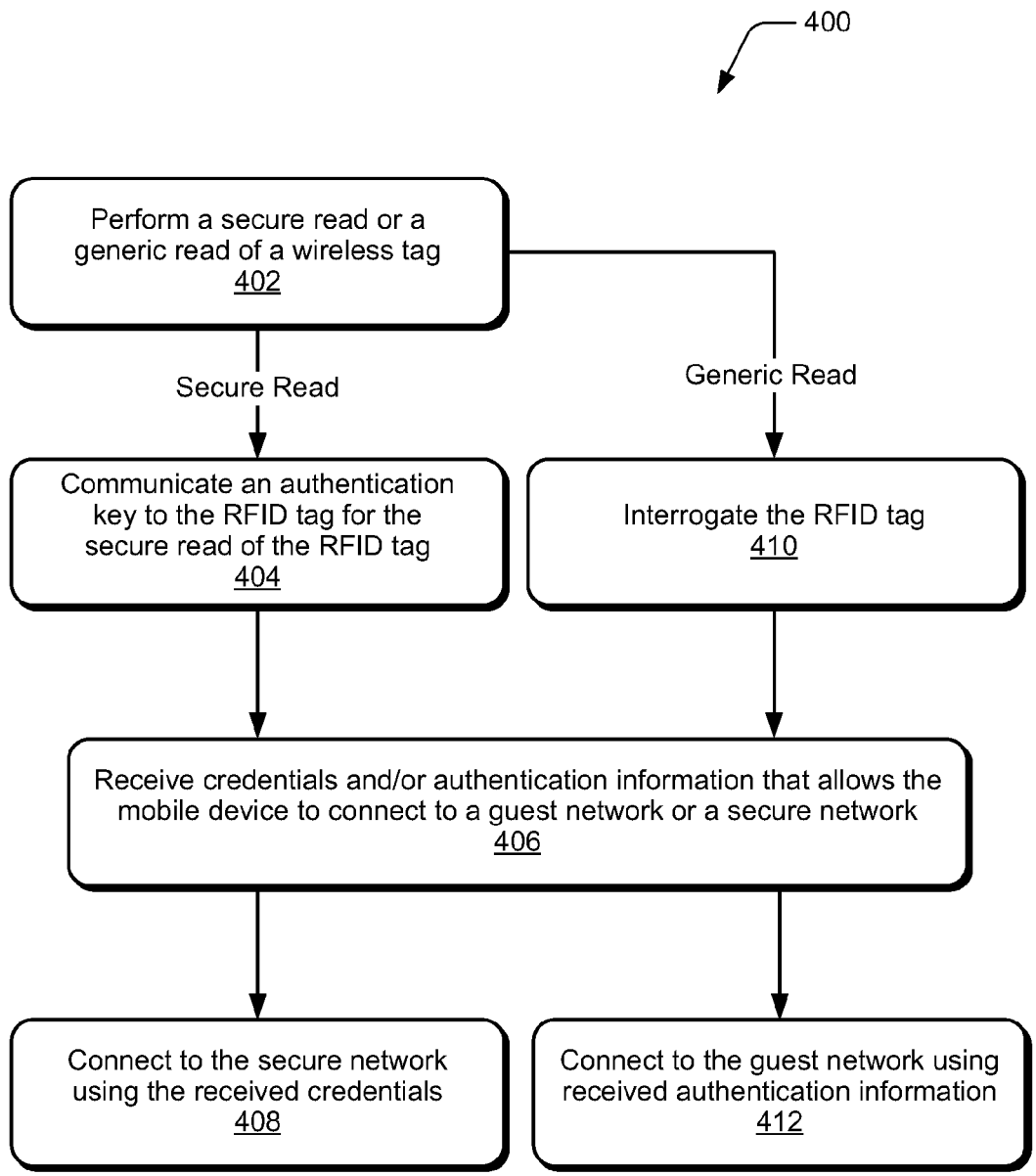

FIG. 4 illustrates example method(s) 400 of RFID-based activation for wireless network communication. The order in which the method is described is not intended to be construed as a limitation, and any number or combination of the described method operations can be performed in any order to perform a method, or an alternate method.

At 402, a secure read or a generic read of a wireless tag is performed. For example, the RFID reader 102 that is implemented in the mobile device 100 performs a secure read or a generic read of the RFID tag 106. A transmitted signal to the RFID tag 106 can indicate a type of read as a secure read or a generic read, and the RFID tags can be implemented to differentiate the type of reads and respond with a specific response based on the type of read (e.g., interrogation).

At 404, an authentication key is communicated to the RFID tag for the secure read of the RFID tag. For example, the RFID reader 102 that is implemented in the mobile device 100 communicates an authentication key (e.g., from the information stored as the wireless network authentication 134) to the RFID tag 106 to perform a secure read of the RFID tag. In implementations, the RFID reader 102 can communicate a specified key to the RFID tag 106, and the RFID tag is programmed to respond with a specific response to the specified key. Other keys may also be transmitted to the RFID tag 106, invoking a specific response from the RFID tag for each key that is transmitted to the RFID tag.

At 406, the mobile device receives credentials and/or authentication information that allows the mobile device to connect to a guest network or a secure network. For example, the RFID reader 102 receives the wireless network credentials 114 and/or other wireless network authentication 134 information from the RFID tag 106 responsive to a secure read or a generic read of the RFID tag, such as guest credentials received from the RFID tag responsive to the generic read at 402. The guest credentials allow the mobile device 100 to connect to a guest network. Alternatively, the RFID reader 102 receives secure credentials (e.g., an authentication key) or other authentication information responsive to the secure read at 402, and the secure credentials allow the mobile device 100 to connect to a secure network.

At 408, the mobile device connects to the secure network using the received credentials. For example, control module 132 initiates a transceiver 126 of a wireless radio system 116 in the mobile device 100 to connect to the secure network using the secure credentials (e.g., the wireless network credentials 114) that are received from the RFID tag 106.

At 410, the RFID tag is interrogated for a generic read of the RFID tag. For example, as an alternative to the secure read, the RFID reader 102 that is implemented in the mobile device 100 interrogates the RFID tag 106 as a generic read. The RFID reader 102 can transmit a predefined signal to perform the generic read of the RFID tag 106, and the RFID tag can identify the predefined signal as a generic read. Again, the RFID reader 102 of the mobile device 100 receives the authentication information from the RFID tag at 406.

At 412, the mobile device connects to the guest network using the received authentication information. For example, control module 132 initiates a transceiver 126 of a wireless radio system 116 in the mobile device 100 to connect to the guest network using the received guest credentials from the RFID tag 106.

Figure 5:
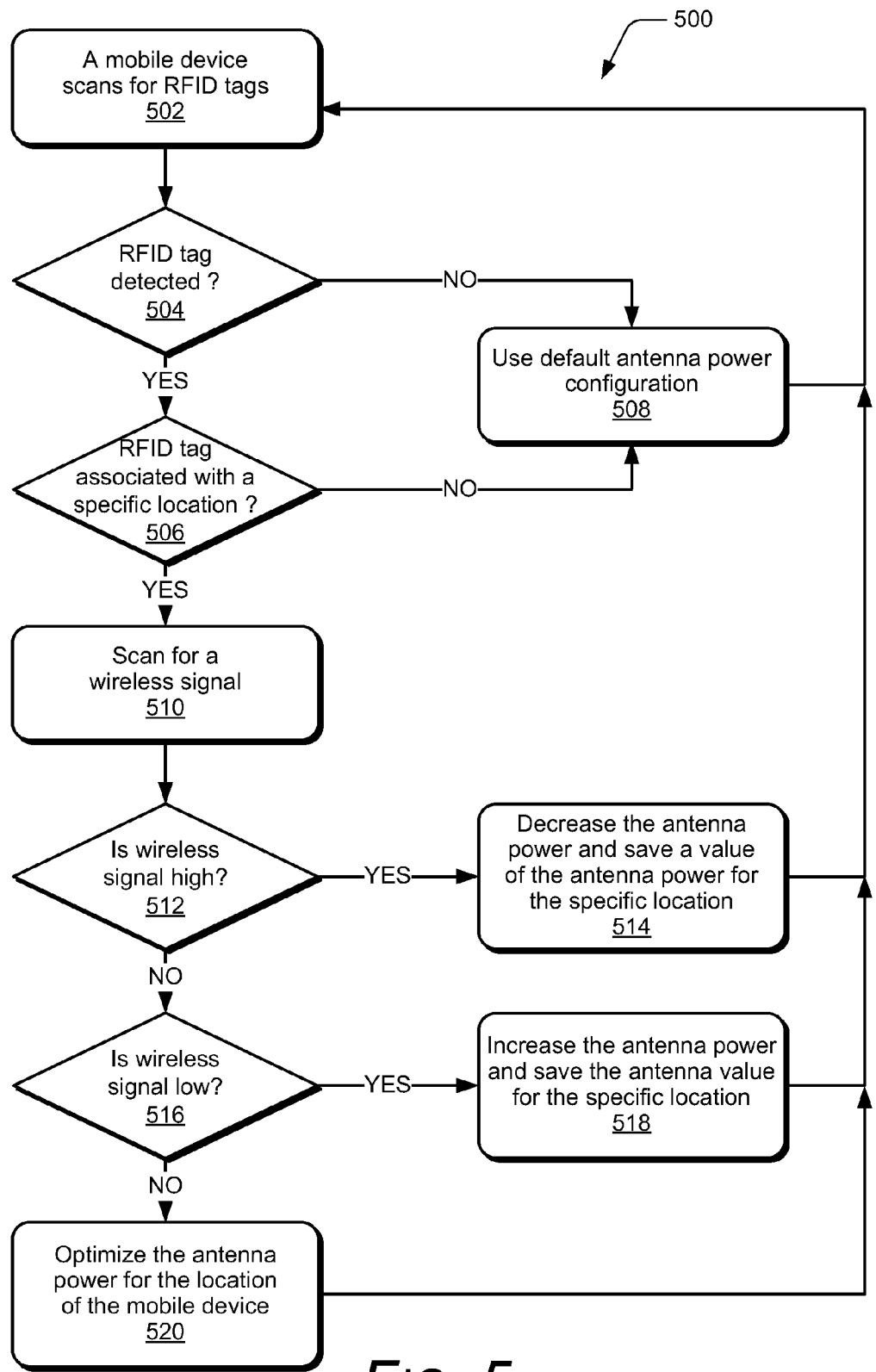
FIGS. 5 and 6 illustrate example methods of RFID-based location determination for antenna power adjustment in accordance with one or more embodiments.

FIG. 5 illustrates example method(s) 500 of RFID-based location determination for antenna power adjustment. The order in which the method is described is not intended to be construed as a limitation, and any number or combination of the described method operations can be performed in any order to perform a method, or an alternate method.

At 502, a mobile device scans for RFID tags. For example, the RFID reader 102 that is implemented in the mobile device 100 scans for RFID tags (e.g., the RFID tag 106) that are within communication range. As described with reference to FIG. 2, the RFID reader 102 can scan for the RFID tags 218 and 222 when a user enters and moves about the building. At 504, a determination is made as to whether an RFID tag has been detected. For example, the control module 132 that is implemented in the mobile device 100 determines whether a RFID tag 218 (or RFID tags 222) has been detected.

If a RFID tag has been detected (i.e., "Yes" from 504), then at 506, a determination is made as to whether the RFID tag is associated with a specific location. For example, the control module 132 determines whether a detected RFID tag 222 is associated with a specific location, area, residence, and/or building room, which can be determined from the RFID tags database 144 that is maintained with device memory 118 in the mobile device 100. The control module 132 can look up the RFID tag information stored in the RFID tags database.

If a RFID tag has not been detected (i.e., "No" from 504), or if a detected RFID tag is not associated with a specific location (i.e., "No" from 506), then at 508, a default antenna power configuration is used. For example, the control module 132 maintains a default antenna power configuration of an antenna 128 for a wireless radio system 116, such as to maintain the best possible coverage to receive the wireless system signal.

If a detected RFID tag is associated with a specific location (i.e., "Yes" from 506), then at 510, the mobile device scans for a wireless signal. For example, the mobile device 100 scans for wireless signals that are within communication range utilizing a Wi-Fi transceiver 126 (or other transceivers of the respective wireless radio systems 116 responsive to the control module 132 determining an association between the RFID tag and the specific location.

At 512, a determination is made as to whether the wireless signal is high (e.g., is a high wireless signal with good coverage). For example, the control module 132 that is implemented in the mobile device 100 determines whether a detected wireless signal is a high wireless signal. If the wireless signal is determined to be a high wireless signal (i.e., "Yes" from 512), then at 514, the antenna power is decreased and a value of the decreased antenna power for the specific location is saved. For example, the control module 132 initiates decreasing the antenna power of an antenna 128 for a wireless radio system 116, and saves the value of the decreased antenna power in the RFID tags database 144.

In an example, the mobile device 100 may be located in the office 204 and the RFID tag at the desk 224 is scanned and located (at 502 and 504) by the RFID reader 102 of the mobile device 100. The wireless network 216 is determined by scanning for wireless networks utilizing a Wi-Fi transceiver 126 when the RFID tag 222 at the desk 224 is located. The learning algorithm 142 of the control module 132 can determine that the wireless signal for wireless network 216 is above a threshold, and then decrease the antenna power of the Wi-Fi transceiver. The threshold value of the antenna power can be an arbitrary value set by the user or a default value. The decrease in the antenna power of the Wi-Fi transceiver 126 results in lower power consumption by the mobile device.

If the wireless signal is not determined to be a high wireless signal (i.e., "No" from 512), then at 516, a determination is made as to whether the wireless signal is low (e.g., is a wireless signal of low strength or poor quality). If the wireless signal is determined to be a low wireless signal (i.e., "Yes" from 516), then at 518, the antenna power is increased and the antenna value for the specific location is saved. For example, the control module 132 initiates increasing the antenna power of an antenna 128 for a wireless radio system 116, and saves the value of the decreased antenna power in the RFID tags database 144.

In an example, the mobile device 100 may be located in the kitchen 214 and the RFID tags 222 at the refrigerator 230 and/or the stove 232 are scanned and located (at 502 and 504) by the RFID reader 102 of the mobile device 100. The wireless network 216 is determined by scanning for wireless networks utilizing a Wi-Fi transceiver 126 when the RFID tag 222 at the refrigerator 230 and/or at the stove 232 is located. The learning algorithm 142 of the control module 132 can determine that the wireless signal for wireless network 216 is below a threshold, and then increase the antenna power of the Wi-Fi transceiver. The threshold value of the antenna power can be an arbitrary value set by the user or a default value. The increase in the antenna power of the Wi-Fi transceiver 126 results in higher power consumption and a higher RSSI value.

If the wireless signal is not determined to be a low wireless signal (i.e., "No" from 516), then at 520, the wireless signal is optimized for the location of the mobile device. For example, the control module 132 is implemented to optimize the antenna power of an antenna 128 for a wireless radio system 116 of the mobile device 100, at the current location of the mobile device, such as located in the residence 202. The method then continues at 502 with the mobile device scanning for RFID tags.

Figure 6:
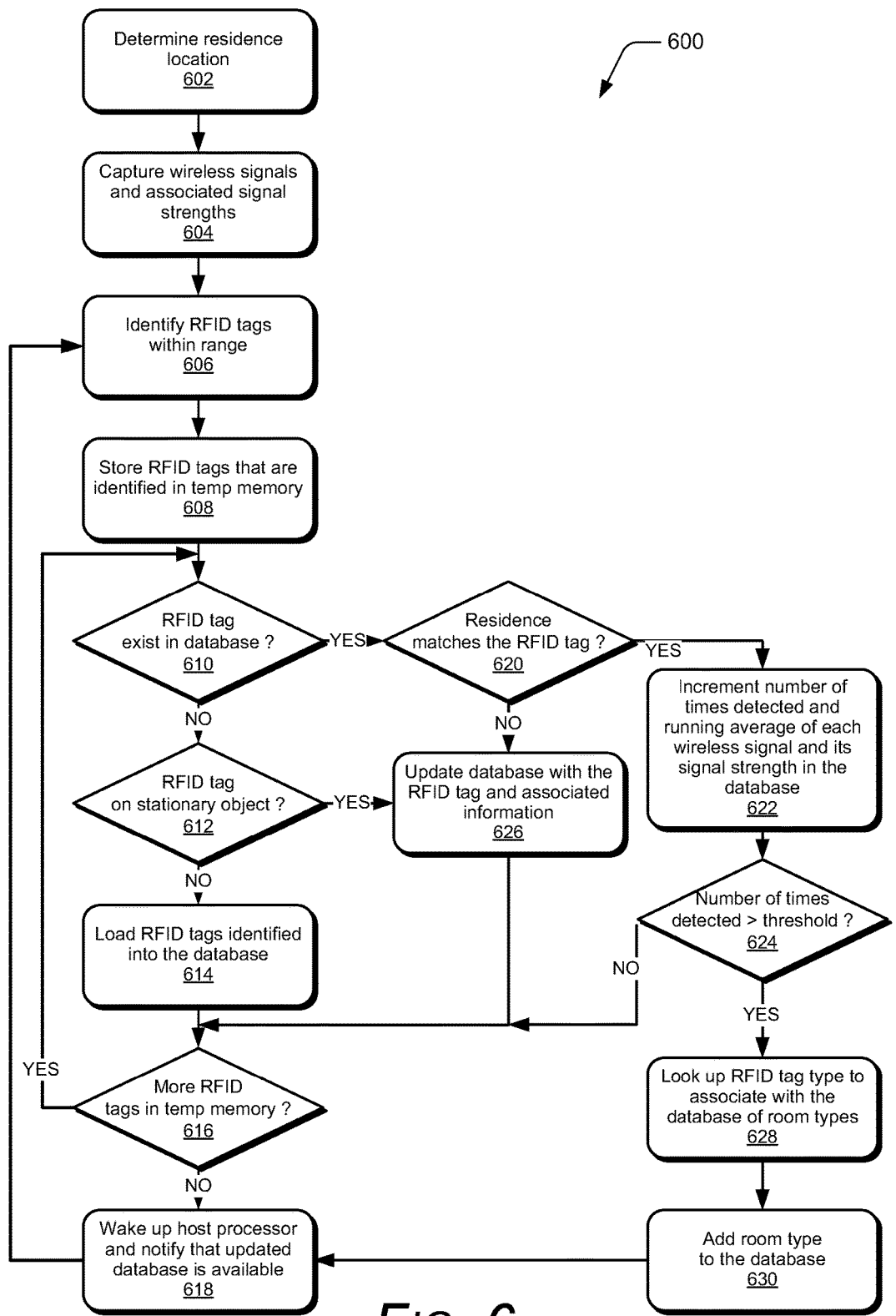

FIG. 6 illustrates example method(s) 600 of RFID-based location determination for antenna power adjustment. The order in which the method is described is not intended to be construed as a limitation, and any number or combination of the described method operations can be performed in any order to perform a method, or an alternate method.

At 602, the mobile device 100 utilizes the positioning system 124 to capture the location of the residence 202, such as with a GPS transceiver 126 to determine the location of the residence. Alternatively, the positioning system 124 may utilize a cellular modem transceiver 126 to determine the location of the residence using cellular network information.

At 604, the mobile device 100 utilizes the activation module 130 and/or the control module 132 to capture wireless signals and associated signal strengths within the residence 202. For example, after determining the location of residence 202, the activation module 130 can activate the Wi-Fi transceiver 126 to scan and capture wireless networks and associated signal strengths for each wireless network found.

At 606, the mobile device 100 utilizes the RFID reader 102 to perform a scan for RFID tags that are within communication range of the mobile device 100. At 608, the learning algorithm 142 of the control module 132 stores the RFID tags that are identified at 606 into a temp memory. The method proceeds to 610 using one of the RFID tags stored in the temp memory and sequentially processes each RFID tag in temp memory individually for the remainder of the process.

At 610, the learning algorithm 142 determines if the RFID tag exists in the RFID tags location database 144. If the RFID tag is found in the RFID tags location database 144, then the method proceeds to 620. If the RFID tag is not found in the RFID tags location database 144, then the method proceeds to 612.

At 612, the learning algorithm 142 determines whether the RFID tag is on or in a stationary object. If the RFID tag is on or in a stationary object, then the method proceeds to 626. If the RFID tag is not on or in a stationary object, then the method proceeds to 614. At 614, the learning algorithm 142 loads or stores the RFID tag identified at 606 into the RFID tags location database 144.

At 616, the learning algorithm 142 determines if there are more RFID tags in the temp memory from 608. If more RFID tags exist in the temp memory, then the method proceeds to 610. If there are no additional RFID tags in the temp memory, then the method proceeds to 618. At 618, the learning algorithm 142 wakes up the processor 120 (e.g., of the processing system) or another module executed by the application processor and notifies that a new or updated RFID tags location database 144 is available.

At 620, responsive to the RFID tag existing in the RFID tags location database 144, the learning algorithm 142 determines whether the current residence at 602 correlates or matches to RFID tag information stored in the RFID tags location database 144. The RFID tag information includes residence location, date and time the RFID tag was read, a type of object the RFID tag is on or in, a running count indicating the number of times the RFID tag has been read, wireless signals and associated signal strengths for each wireless signal captured by the mobile device 100, and/or a room type associated with the RFID tag.

At 622, responsive to the current residence and the RFID tag information existing and correlating in the RFID tags location database 144 at 620, the learning algorithm 142 updates the RFID tag information stored in the RFID tag location database by incrementing a running count of the number of times the RFID tag has been detected, storing wireless signals captured at 604, and storing the signal strength for each wireless signal captured. The signal strength can be represented by a Received Signal Strength Indication (RSSI) value 136 that is an indication of a power level being received by the mobile device 100. The RSSI value 136 stored in the RFID tags location database 144 is a representation of the signal strength of wireless network 216 in a particular room of the residence 202.

For example, the mobile device 100 is in the office 204 which is relatively close to the wireless network 216. Due to the close proximity of the mobile device 100 and the wireless network 216, the RSSI value 136 of the wireless network 216 indicates a relatively high value correlating to a high signal strength (e.g., indicated as the highest Wi-Fi signal 234) when compared to the mobile device 100 being in other rooms. For example, the mobile device 100 near the doorway 220 which is approximately the furthest distance from wireless network 216. This location in the residence 202 may be the lowest signal strength as indicated by the lowest Wi-Fi signal 236 and the RSSI value 136 of the wireless network 216 near the doorway 220 will be lower than the RSSI value when the mobile device is in the office 204.

At 624, the learning algorithm 142 determines if the running count of the number of times the RFID tag has been detected is greater than a threshold value. The threshold value can be an arbitrary value set by the user or a default value. If the running count exceeds the threshold, then the method proceeds to 628. If the running count does not exceed the threshold, then the method proceeds to 616.

At 626, responsive to the determination at 612 or at 620, the learning algorithm 142 updates the RFID tags location database 144 with the RFID tag information. The RFID tag information includes residence location, date and time the RFID tag was read, a type of object the RFID tag is on or in, a running count indicating the number of times the RFID tag has been read, wireless signals and associated signal strengths for each wireless signal captured by mobile device 100, and/or a room type associated with the RFID tag.

At 628, responsive to the determination that the number of times the RFID tag has been detected is greater than the threshold value, the learning algorithm 142 determines a tag type associated with the object that the RFID tag is on or in. Based on the RFID tag type, a room type is associated with the RFID tag. At 630, the learning algorithm 142 updates the RFID tags location database 144 to store or update the room type associated with the RFID tag.

Figure 7:
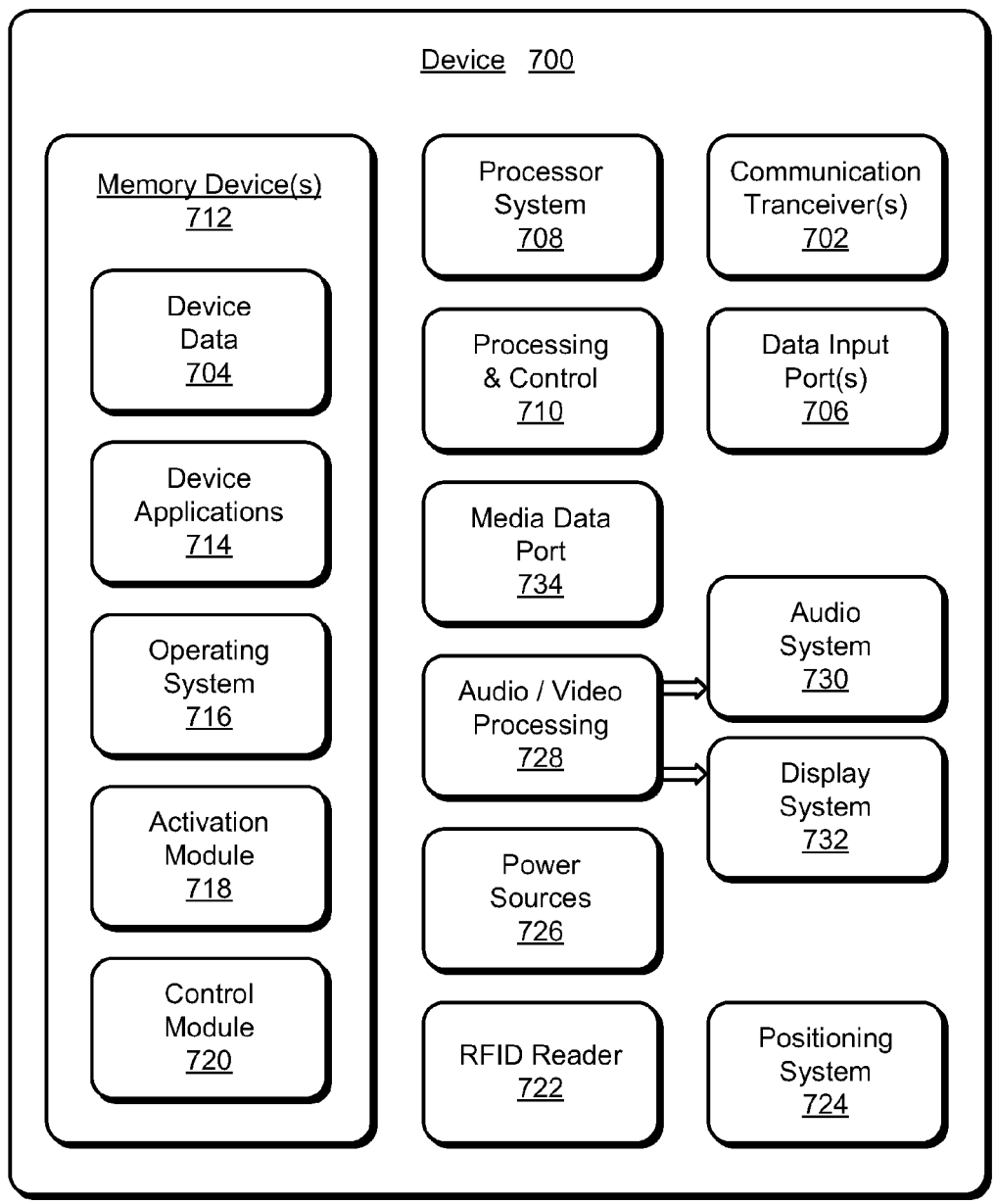
FIG. 7 illustrates various components of an example device that can implement embodiments of RFID contextual location determination and sensing.

FIG. 7 illustrates various components of an example device 700 in which embodiments of RFID contextual location determination and sensing for wireless network communication can be implemented. The example device 700 can be implemented as any of the computing devices described with reference to the previous FIGS. 1-6, such as any type of client device, mobile phone, tablet, computing, communication, entertainment, gaming, media playback, and/or other type of device. For example, the mobile device 100 shown in FIG. 1 may be implemented as the example device 700.

The device 700 includes communication transceivers 702 that enable wired and/or wireless communication of device data 704 with other devices. Additionally, the device data can include any type of audio, video, and/or image data. Example transceivers include wireless personal area network (WPAN) radios compliant with various IEEE 802.15 (Bluetooth™) standards, wireless local area network (WLAN) radios compliant with any of the various IEEE 802.11 (WiFi™) standards, wireless wide area network (WWAN) radios for cellular phone communication, wireless metropolitan area network (WMAN) radios compliant with various IEEE 802.15 (WiMAX™) standards, and wired local area network (LAN) Ethernet transceivers for network data communication.

The device 700 may also include one or more data input ports 706 via which any type of data, media content, and/or inputs can be received, such as user-selectable inputs to the device, messages, music, television content, recorded content, and any other type of audio, video, and/or image data received from any content and/or data source. The data input ports may include USB ports, coaxial cable ports, and other serial or parallel connectors (including internal connectors) for flash memory, DVDs, CDs, and the like. These data input ports may be used to couple the device to any type of components, peripherals, or accessories such as microphones and/or cameras.

The device 700 includes a processing system 708 of one or more processors (e.g., any of microprocessors, controllers, and the like) and/or a processor and memory system implemented as a system-on-chip (SoC) that processes computer-executable instructions. The processor system may be implemented at least partially in hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that is implemented in connection with processing and control circuits, which are generally identified at 710. The device 700 may further include any type of a system bus or other data and command transfer system that couples the various components within the device. A system bus can include any one or combination of different bus structures and architectures, as well as control and data lines.

The device 700 also includes computer-readable storage memory 712 that enable data storage, such as data storage devices that can be accessed by a computing device, and that provide persistent storage of data and executable instructions (e.g., software applications, programs, functions, and the like). Examples of the computer-readable storage memory 712 include volatile memory and non-volatile memory, fixed and removable media devices, and any suitable memory device or electronic data storage that maintains data for computing device access. The computer-readable storage memory can include various implementations of random access memory (RAM), read-only memory (ROM), flash memory, and other types of storage media in various memory device configurations. The device 700 may also include a mass storage media device.

The computer-readable storage memory 712 provides data storage mechanisms to store the device data 704, other types of information and/or data, and various device applications 714 (e.g., software applications). For example, an operating system 716 can be maintained as software instructions with a memory device and executed by the processing system 708. The device applications may also include a device manager, such as any form of a control application, software application, signal-processing and control module, code that is native to a particular device, a hardware abstraction layer for a particular device, and so on. In this example, the device 700 includes an activation module 718 and/or a control module 720 that implement embodiments of RFID contextual location determination and sensing for wireless network communication, and may be implemented with hardware components and/or in software, such as when the device 700 is implemented as the mobile device 100 described with reference to FIGS. 1-6. An example of the activation module 718 is the activation module 130, and an example of the control module 720 is the control module 132 that is implemented by the mobile device 100.

The device 700 also includes an RFID reader 722, such as described with reference to the RFID reader 102 that is implemented in the mobile device 100. The device 700 also includes a positioning system 724 that determines a geographical location of the device 700. The positioning system 724 can include a GPS transceiver and/or a cellular transceiver. The device 700 can also include one or more power sources 726, such as when the device is implemented as a mobile device. The power sources may include a charging and/or power system, and can be implemented as a flexible strip battery, a rechargeable battery, a charged super-capacitor, and/or any other type of active or passive power source.

The device 700 also includes an audio and/or video processing system 728 that generates audio data for an audio system 730 and/or generates display data for a display system 732. The audio system and/or the display system may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 734. In implementations, the audio system and/or the display system are integrated components of the example device. Alternatively, the audio system and/or the display system are external, peripheral components to the example device.

Although embodiments of RFID contextual location determination and sensing for wireless network communication have been described in language specific to features and/or methods, the subject of the appended claims is not necessarily limited to the specific features or methods described. Rather, the specific features and methods are disclosed as example implementations of RFID contextual location determination and sensing for wireless network communication, and other equivalent features and methods are intended to be within the scope of the appended claims. Further, various different embodiments are described and it is to be appreciated that each described embodiment can be implemented independently or in connection with one or more other described embodiments.

The invention claimed is:

1. A method for radio-frequency identification (RFID)-based activation of one or more transceivers in a mobile device, the method comprising:
   transmitting, via a RFID reader of the mobile device, a signal to an RFID tag indicating a type of read of the RFID tag, the type of read being one of a secure read or a generic read;
   receiving a notification that one or more wireless networks are available based on communication with the RFID tag;
   receiving information from the RFID tag regarding at least one of the one or more wireless networks based on the type of read of the RFID tag, the at least one wireless network being a secure network or a guest network, the information comprising one of: in response to the secure read of the RFID tag, authentication information to allow the mobile device to connect to the secure network, or in response to the generic read of the RFID tag, guest information to allow the mobile device to connect to the guest network; and
   activating at least one transceiver in the mobile device for communication via the secure network or the guest network based on the type of read of the RFID tag performed by the RFID reader.

2. The method as recited in claim 1, further comprising:
   transmitting a key from the mobile device to the RFID tag;
   receiving credentials from the RFID tag; and
   connecting, using one of the transceivers, to the wireless network using the received credentials from the RFID tag.

3. The method as recited in claim 1, wherein the wireless network is the secure network and the type of read of the RFID tag is the secure read, further comprising:
   communicating an authentication key to the RFID tag from the mobile device for the secure read of the RFID tag;
   receiving credentials from the RFID tag that allows the mobile device to connect to the secure network; and
   connecting to the secure network utilizing the received credentials.

4. The method as recited in claim 1, wherein the wireless network is the guest network and the type of read of the RFID tag is the generic read, further comprising:
   interrogating the RFID tag from the mobile device;

said receiving the guest information that includes guest credentials to allow the mobile device to connect to the guest network; and
connecting to the guest network utilizing the guest credentials.

5. The method as recited in claim 1, wherein the one or more transceivers in the mobile device include a Wi-Fi transceiver, a Bluetooth™ transceiver, a Global Positioning System (GPS) transceiver, a Near Field Communication (NFC) transceiver, and a cellular network transceiver.

6. The method as recited in claim 1, further comprising:
computing, using a processor of the mobile device, received signal strength indicator (RSSI) values for the one or more wireless networks by utilizing data obtained from a respective one of the one or more transceivers that communicate with each of the one or more wireless networks.

7. The method as recited in claim 6, wherein said activating the at least one transceiver in the mobile device is based on the computed RSSI value for the wireless network that corresponds to the at least one transceiver.

8. The method as recited in claim 1, wherein said activating the at least one transceiver in the mobile device includes applying power to the at least one transceiver.

9. A mobile device, comprising:
a radio-frequency identification (RFID) reader configured to interrogate and communicate with RFID tags, and transmit a signal indicating a type of read of the RFID tags, the type of read being one of a secure read or a generic read;
one or more transceivers configured for communication via respective wireless networks;
a memory and processing system to implement an activation module that is configured to:
receive a notification from the RFID reader that one or more wireless networks are available based on communication with at least one of the RFID tags;
receive information regarding at least one of the one or more wireless networks based on the type of read of the RFID tag, the at least one wireless network being a secure network or a guest network, the information comprising one of: in response to the secure read of the RFID tag, authentication information to allow the mobile device to connect to the secure network, or in response to the generic read of the RFID tag, guest information to allow the mobile device to connect to the guest network; and
activate at least one transceiver in the mobile device for communication via the secure network or the guest network based on the type of read of the RFID tag performed by the RFID reader.

10. The mobile device as recited in claim 9, wherein:
the RFID reader is configured to transmit an authentication key to the RFID tag and receive credentials from the RFID tag;
the activation module is configured to:
initiate a connection of one of the transceivers to the wireless network using the received credentials from the RFID tag; and
deactivate the transceiver connected to the wireless network responsive to a determination that the wireless network is no longer available.

11. The mobile device as recited in claim 9, wherein the wireless network is the secure network and the type of read of the RFID tag is the secure read, and wherein:

the RFID reader is configured to communicate an authentication key to the RFID tag from the mobile device for the secure read of the RFID tag;
the RFID reader is configured to receive credentials from the RFID tag that allows the mobile device to connect to the secure network; and
the activated transceiver is configured to connect to the secure network utilizing the received credentials.

12. The mobile device as recited in claim 9, wherein the network is the guest network and the type of read of the RFID tag is the generic read, and wherein:
the RFID reader is configured to interrogate the RFID tag from the mobile device;
the RFID reader is configured to said receive the guest information that includes guest credentials to allow the mobile device to connect to the guest network; and
the activated transceiver is configured to connect to the guest network utilizing the guest credentials.

13. The mobile device as recited in claim 9, where the one or more transceivers include a Wi-Fi transceiver, a Bluetooth™ transceiver, a Global Positioning System (GPS) transceiver, a Near Field Communication (NFC) transceiver, and/or a cellular transceiver.

14. The mobile device as recited in claim 9, wherein the activation module is further configured to compute received signal strength indicator (RSSI) values for the one or more wireless networks by utilizing data obtained from a respective one of the one or more transceivers that communicate with each of the one or more wireless networks.

15. A system, comprising:
a radio-frequency identification (RFID) tag configured to maintain authentication information associated with a secure Wi-Fi network and maintain guest information associated with a guest Wi-Fi network;
a RFID reader configured to interrogate and communicate with the RFID tag to receive the authentication information associated with the secure Wi-Fi network in response to the RFID reader performing a secure read of the RFID tag, or receive the guest information associated with the guest Wi-Fi network in response to the RFID reader performing a generic read of the RFID tag;
an activation module that is configured to:
receive a notification from the RFID reader that the secure Wi-Fi network is available based on the authentication information or the guest Wi-Fi network is available based on the guest information received from the RFID tag; and
receive, from the RFID reader in response to the secure read of the RFID tag, the authentication information associated with the secure Wi-Fi network allowing a Wi-Fi transceiver to connect to the secure network; or
receive, from the RFID reader in response to the generic read of the RFID tag, the guest information associated with the guest Wi-Fi network allowing the Wi-Fi transceiver to connect to the guest network; and
activate the Wi-Fi transceiver for communication via the secure Wi-Fi network or the guest Wi-Fi network based on the RFID reader performing the secure read or the generic read of the RFID tag.

16. The system as recited in claim 15, wherein:
the RFID reader is configured to transmit a key to the RFID tag and receive credentials from the RFID tag;
the activation module is configured to initiate a connection of the Wi-Fi transceiver to the secure Wi-Fi network or the guest Wi-Fi network using the received credentials from the RFID tag.

17. The system as recited in claim 16, wherein the activation module is configured to deactivate the Wi-Fi transceiver connected to the secure Wi-Fi network or the guest Wi-Fi network if the respective secure Wi-Fi network or the guest Wi-Fi network is no longer available.

18. The system as recited in claim 15, wherein the activation module is further configured to compute a received signal strength indicator (RSSI) value for the Wi-Fi network by utilizing data obtained by the Wi-Fi transceiver in the mobile device.

19. The system as recited in claim 15, wherein the RFID reader is configured to:
communicate an authentication key to the RFID tag for the secure read of the RFID tag;
receive credentials from the RFID tag that allows the Wi-Fi transceiver to connect to the secure Wi-Fi network; and
the Wi-Fi transceiver is configured to connect to the secure Wi-Fi network utilizing the received credentials.

20. The system as recited in claim 15, wherein:
the RFID reader is configured to said receive the guest information that includes guest credentials allowing the connection to the guest Wi-Fi network; and
the Wi-Fi transceiver is configured to connect to the guest Wi-Fi network utilizing the guest credentials.

\* \* \* \* \*